United States Patent
Costen (10) Patent No.: US 8,612,188 B2
(45) Date of Patent: Dec. 17, 2013

(54) WAVE MODELLING (75) Inventor: Fumie Costen, Chesire (GB)

(73) Assignee: The University of Manchester (GB)

( * ) Notice: Subject to any disclaimer, the term of this patent is extended or adjusted under 35 U.S.C. 154(b) by 139 days.

(21) Appl. No.: 13/180,154

(22) Filed: Jul. 11, 2011

(65) Prior Publication Data
US 2012/0010862 A1    Jan. 12, 2012

Related U.S. Application Data (60) Provisional application No. 61/363,317, filed on Jul. 12, 2010.

(51) Int. Cl.
*G06F 7/60*    (2006.01)

(52) U.S. Cl.
USPC .................................. 703/2; 703/5; 703/9

(58) Field of Classification Search
USPC .............................................................. 703/2
See application file for complete search history.

(56) References Cited

U.S. PATENT DOCUMENTS 7,826,989 B2 * 11/2010 Kiso .............................. 702/65

OTHER PUBLICATIONS

Berenger, "On the Huygens absorbing boundary conditions for electromagnetics", Apr. 21, 2007, Elsevier Inc., pp. 354-378.*
Sudiarta, "An Absorbing Boundary Condition for FDTD Truncation Using Multiple Absorbing Surfaces", 2003, IEEE, pp. 3268-3275.*
Bamberger et al. "Second Order Absorbing Boundary Conditions for the Wave Equation: A Solution for the Corner Problem", 1987, INRIA and Petrole, pp. 1-79.*
Yavuz, "Time reversal based signal processing techniques for ultrawideband electromagnetic sensing in random media," PhD Thesis, Ohio State University, 2008, pp. 1-204.

* cited by examiner

*Primary Examiner* — Omar Fernandez Rivas
*Assistant Examiner* — Iftekhar Khan
(74) *Attorney, Agent, or Firm* — Douglas G. Gallagher; Bingham Greenebaum Doll LLP (57) ABSTRACT

A computer implemented method of modelling propagation of a wave through a first space. In one embodiment, the instructions store data in the memory representing a first space and a second space, the first space being within the second space, wherein the second space comprises a plurality of calculation blocks, each calculation block that generates a value representing propagation of a wave at a point in the second space, each calculation block carrying out a calculation to determine a value for the point in the second space represented by the calculation block based upon a value generated by at least one other calculation block, and store data in the memory defining at least one boundary defining the first space within the second space, the at least one boundary further dividing the second space into at least two spaces outside of the first space.

21 Claims, 6 Drawing Sheets

Fig. 9

WAVE MODELLING

This application claims the benefit of U.S. Provisional Application No. 61/363,317, filed Jul. 12, 2010, the entirety of which is hereby incorporated herein by reference.

FIELD

The present invention relates to methods and apparatus for modelling propagation of electromagnetic waves through a space. More particularly, but not exclusively, the present invention relates to methods and apparatus for modelling propagation of electromagnetic waves using a finite difference time domain method and a Huygens absorbing boundary condition.

BACKGROUND

Waves such as ultra low frequency waves, microwaves and visible light waves are widely used in a large range of technologies. For example, low frequency waves are used in geophysical exploration, microwaves are used in radar and wireless technologies and light waves are used in optical technologies. As such, it is important to be able to accurately model how waves move through a space, in order to be able to understand and use the waves effectively.

The finite difference time domain (FDTD) method is known to be effective at modelling propagation of waves within a space. The FDTD method is an iterative method which operates by dividing a space to be modelled into a plurality of magnetic (H) and electric (E) points. Discretising the space in this way allows a continuous wave to be modelled in a discrete space. Each iteration of the FDTD method calculates either values for all H points or values for all E points and movement of a wave through the space is modelled iteratively. In order to model a continuous wave in this way, half iterations are used so that one time step takes the form of two half iterations, with each iteration updating one of the H and E values. It will be appreciated that in the real world, waves propagate through an infinite space. Modelling an infinite space is not computationally possible using current computing techniques and as such, FDTD spaces in which waves are modelled must be bounded. This is problematic as boundaries cause reflection of the wave which would not occur in the real world, given that in the real world the boundary is not present. As such, it is desirable to use boundaries that do not cause reflection.

One known way of bounding a FDTD space used for modelling a wave which addresses some of the problems set out above is to use a Perfectly Matched Layer (PML). The PML can be used as an absorbing boundary condition (ABC) such that waves that meet the boundary are absorbed rather than reflected, and use of the PML as an ABC has been shown to allow effective modelling of how a wave propagates in the real world. However, use of the PML as an ABC is computationally expensive.

A further ABC that has been proposed is the Huygens absorbing boundary condition (HABC). This is often used in combination with a Perfect Electrical Conductor (PEC) placed a small number of FDTD points outside of the HABC. The method using an HABC and PEC is computationally inexpensive and effective in some circumstances, however it is known that values indicating wave propagation at some FDTD points generated using this method do not always agree with theoretical values. A computationally inexpensive method of effectively modelling a wave in a space is therefore desirable.

SUMMARY

It is an object of some embodiments of the present invention to obviate or mitigate at least some of the problems set out above.

According to embodiments of the invention there is provided a computer implemented method of modelling propagation of a wave through a first space using a computer comprising a processor and a memory, the processor being configured to read and execute instructions stored in the memory.

In some embodiments, the processor is a microcontroller or general purpose microprocessor that reads its program from memory. The processor may be comprised of one or more components configured as a single unit. Alternatively, when of a multi-component form, the processor may have one or more components located remotely relative to the others. One or more components of the processor may be of the electronic variety including digital circuitry, analog circuitry, or both. In one embodiment, the processor is of a conventional, integrated circuit microprocessor arrangement, such as one or more CORE 2 QUAD processors from INTEL Corporation of 2200 Mission College Boulevard, Santa Clara, Calif. 95052, USA, or ATHLON or PHENOM processors from Advanced Micro Devices, One AMD Place, Sunnyvale, Calif. 94088, USA, or POWER6 processors from IBM Corporation, 1 New Orchard Road, Armonk, N.Y. 10504, USA. In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, the memory in various embodiments includes one or more types such as solid-state electronic memory, magnetic memory, or optical memory, just to name a few. By way of non-limiting example, the memory can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. The memory may also be volatile, nonvolatile, or a hybrid combination of volatile and nonvolatile varieties.

The instructions are configured to: store data in the memory representing the first space; store data in the memory representing a second space, the first space being within the second space, wherein the second space comprises a plurality of calculation blocks, each calculation block being arranged to generate a value representing propagation of a wave at a point in the second space, each calculation block being arranged to carry out a calculation to determine a value for the point in the second space represented by the calculation block based upon a value generated by at least one other calculation block; and store data in the memory defining at least one boundary defining the first space within the second space the at least one boundary further dividing the second space into at least two spaces outside of the first space, wherein each calculation block performs a calculation at least partly based upon whether the calculation block is adjacent to the boundary. The method comprises generating, using the processor, data based upon values generated by the calculation blocks, the data representing propagation of the wave through the first space.

The inventors have surprisingly realised that by defining a boundary that not only divides the first space for which propagation of the wave is to be modelled from a second space, but that also further divides the second space into at least two spaces outside of the first space, propagation of the wave is modelled more accurately in the first space for which propagation of the wave is to be modelled.

Some known methods for modelling wave propagation are based upon a space which is divided by a boundary to form an inner space and an outer space. The outer space is itself bounded by an outer boundary. The boundary may be modelled as an absorbing boundary (using an absorbing boundary condition such as the Huygens absorbing boundary condition), while the outer boundary may be modelled as a perfect electrical conductor. The inventors have discovered that where the inner space is generally rectangular, inaccurate modelling of wave propagation is achieved resulting from modelling carried out at corners of the inner space where a first straight part of the boundary and a second straight part of the boundary meet. This is because some absorbing boundary conditions require that a wave passes through the absorbing boundary, is reflected by the outer boundary and passes back through the absorbing boundary to effect correct modelling of propagation. At corners of the inner space, a wave may pass through a first straight part of the inner boundary and be reflected by the outer boundary so as to pass through a second straight part of the inner boundary. That is, each of two parts of the inner boundary is each crossed once by the modelled wave. Given that each straight part of the inner boundary might effect a different transformation on the modelled wave, such reflection at corners of the inner space is such as to render inoperative the effect of the absorbing boundary condition. This realisation has not, heretofore, been arrived at. The inventors have surprisingly realised that extensions of the boundaries so as to divide parts of the outer space can ensure that a wave passes through a particular straight part of the boundary twice, thereby rendering the absorbing boundary condition effective.

While the preceding paragraph describes the invention in terms of rectangular spaces and straight boundaries, it will be appreciated that the invention is not so limited. Rather the spaces can have any shape, as can the boundaries. Similarly, where first and second parts of the boundary have been described above, and such parts of the boundary meet at a corner in the described illustration, it will be appreciated that the invention need not be so limited.

The data may represent the first space using a method selected from the group consisting of: a finite difference time domain (FDTD) method, a finite element method (FEM), a method of moment (MOM), a finite volume method (FVM), a finite difference frequency domain (FDFD) method and any suitable method for modelling propagation of waves.

The modelling of wave propagation using a finite difference time domain method is described in "Computational Electromagnetics. The finite-difference Time-domain method" Taflove, A. and Hagness, S. Artech House 2005. The invention, however, extends modelling using the FDTD method (as well as other suitable methods) to overcome the problems described above.

Each of the plurality of calculation blocks may represent one of a first and second wave component, and calculation blocks representing adjacent points in the second space may represent different ones of the first and second wave components. Each calculation block may be arranged to carry out a calculation to determine a value for the point in the second space represented by the calculation block based upon a value generated by calculation blocks representing points adjacent to the point in the second space.

The wave may be an electromagnetic wave. The first wave component may be an electric wave component and the second wave component may be a magnetic wave component.

Each calculation block adjacent to the boundary may perform a calculation according to a Huygens absorbing boundary condition.

Each calculation block not adjacent to the boundary may perform a calculation according to a method selected from the group consisting of: a FDTD method, a finite element method, a method of moment, a finite volume method, a FDTD method and any suitable method for modelling propagation of waves.

The first space may be positioned centrally within the second space. The second space may extend around the first space.

The second space may be bounded by points having a value 0, and calculation blocks representing points adjacent to the points having a value 0 may carry out a calculation based upon the value 0. Alternatively, the second space may be bounded by any absorbing boundary condition, for example a Perfectly Matched Layer (PML) or a Higdon operator.

The at least one boundary may extend to an outer boundary of the second space.

The first and second spaces may be two-dimensional spaces. The first and second spaces may be generally rectangular two-dimensional spaces. The at least one boundary may further divide the second space into eight spaces outside of the first space. A first four of the eight spaces may each define a side space having a side defined by a side of the inside space and a side defined by part of a boundary of the outside space. A second four of the eight spaces may define corner spaces, each corner space having two sides defined by ends of two of the side spaces and two sides defined by a part of a boundary of the outside space.

The first and second spaces may be three-dimensional spaces. The first and second spaces may be generally cuboid three-dimensional spaces. The at least one boundary may further divide the second space into twenty six three-dimensional spaces outside of the first space. Six of the twenty six spaces may each define cuboids having a first side corresponding to one side of the first space, a second side forming part of the outer boundary of the second space and being parallel to the first side, and four further sides joining the first and second sides. Eight of the twenty six spaces may each define corner cuboids, each corner cuboid abutting a respective corner of the first space. Twelve of the twenty six spaces may each define side cuboids, each side cuboid abutting a respective intersection of two sides of the first space.

Aspects of the invention can be implemented in any convenient form. For example computer programs may be provided to carry out the methods described herein. Such computer programs may be carried on appropriate computer readable media which term includes appropriate tangible storage devices (e.g. discs). Aspects of the invention can also be implemented by way of appropriately programmed computers.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Embodiments of the present invention will now be described, by way of example only, with reference to the accompanying drawings, in which.

DETAILED DESCRIPTION OF THE ILLUSTRATED EMBODIMENTS

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features that are not relevant to the present invention may not be shown for the sake of clarity.

Any reference to "invention" within this document is a reference to an embodiment of a family of inventions, with no single embodiment including features that are necessarily included in all embodiments, unless otherwise stated. Further, although there may be references to advantages provided by some embodiments of the present invention, it is understood that other embodiments may not include those same advantages, or may include different advantages. Any advantages described herein are not to be construed as limiting to any of the claims.

Specific quantities (spatial dimensions, times, resistance, current, voltage, wavelengths, frequencies, coefficients, dimensionless parameters, etc.) may be used explicitly or implicitly herein, such specific quantities are presented as examples only and are approximate values unless otherwise indicated.

Figure 1:
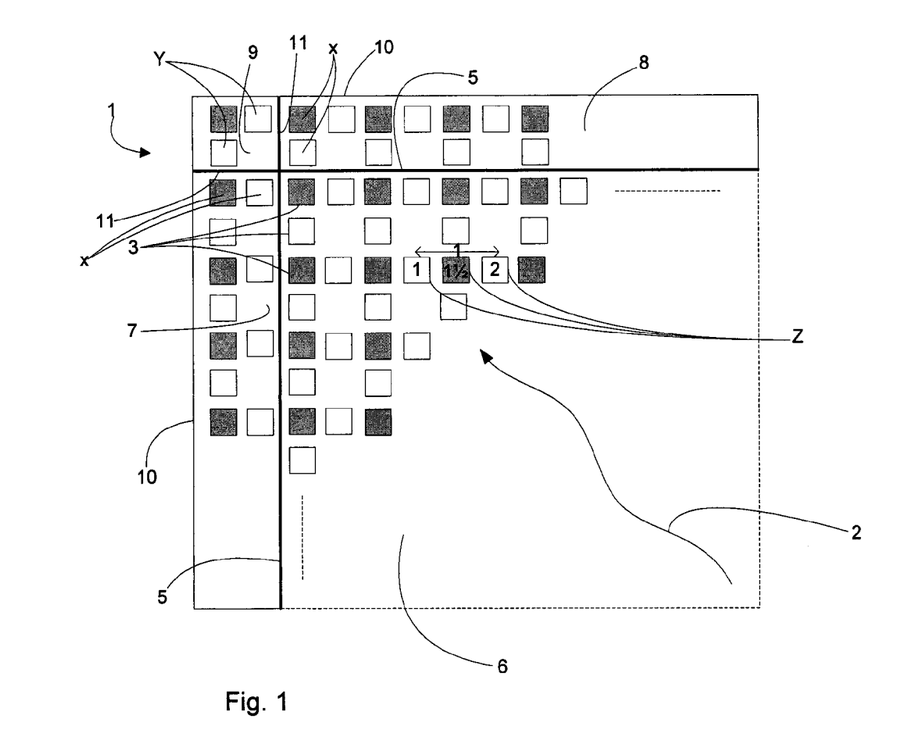
FIG. 1 is a schematic illustration of part of a computational domain for simulating propagation of a wave in accordance with the invention.

Referring now to FIG. 1, part of a computational domain 1 for simulating propagation of a wave 2 is shown. The domain 1 is a cross section on a constant plane of a finite-difference time domain (FDTD) having three dimensions and comprises a plurality of discrete calculation blocks 3, although other domain suitable for simulating propagation of a wave may be used. Each calculation block 3 represents a location defined by three coordinates (i,j,k) within the domain 1 and the cross section of FIG. 1 is defined by setting one of i,j,k to a constant value such that all points shown have one of coordinates i,j,k equal. The three coordinates may take values of whole or half numbers in order to represent the two components of the discretised wave in a single discrete space step. Each calculation block 3 is arranged to carry out a calculation to determine either an electric field vector component (E) or a magnetic field vector component (H) at a given time t, with each calculation block arranged to calculate a different vector component to adjacent calculation blocks. For adjacent calculation blocks in a plane (which represent different vector components), one of the coordinate values varies by ½ such that in a single discrete space step in the domain 1, one of each of the electric field vector component and magnetic field vector component calculation blocks will be present (as illustrated by calculation blocks Z in FIG. 1). That is, for example, where each un-shaded block 3 is arranged to calculate an electric field vector component, each shaded block 3 is arranged to calculate a magnetic field vector component. Each calculation block takes as input a previous value of that calculation block and values from adjacent calculation blocks. In this way, propagation of the wave 2 through the domain 1 can be determined in a step-wise manner at a plurality of discrete time points for each point represented by a calculation block.

In order that it is possible to computationally simulate propagation of the wave 2 through a space, the domain 1 has finite dimensions and is therefore bounded. Lines 5 indicate boundaries of a space 6 for which propagation of the wave 2 is to be simulated. However, it will be appreciated that the space that the domain 1 simulates does not have such boundaries. When the wave 2 meets boundaries 5 it is desirable that the boundaries 5 are arranged such that the wave 2 is not reflected back into the space 6, since such reflection does not occur in the unbounded physical space that is being simulated. As such, the calculation carried out by calculation blocks 3 lying adjacent to the boundaries 5 is modified in accordance with an Absorbing Boundary Condition (ABC), which is designed to simulate radiation of a field equal in magnitude and opposite in sign to the field of the wave to be cancelled, and therefore to reduce or eliminate reflection of the wave into the space 6.

The Huygens Absorbing Boundary Condition (HABC) can be used in a simulation of propagation of a wave 2 in a domain 1. Using the HABC method additional spaces 7, 8, 9 are created in the domain 1 by the boundaries 5, 11. The additional spaces are bounded by an Perfect Electrical Conductor (PEC) boundary 10. The HABC method uses a modified calculation block either side of boundaries 5 to simulate radiation of a field equal in magnitude and opposite in sign to the field of the wave 2 to be cancelled. It has been found that extending boundaries 5 in corner regions, indicated by lines 11 provides a better simulation of propagation of a wave 2 in a domain 1.

Figure 1A:
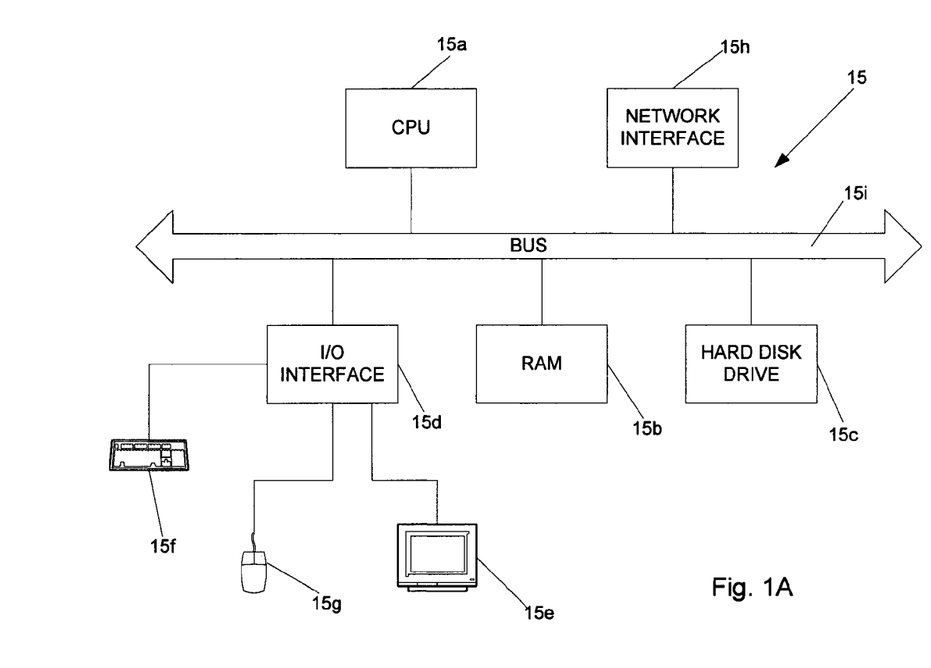
FIG. 1A is a schematic illustration showing a computer suitable for processing the domain of FIG. 1.

FIG. 1A shows a computer 15 suitable for carrying out the invention in detail. It can be seen that the computer comprises a CPU 15a which is configured to read and execute instructions stored in a volatile memory 15b which takes the form of a random access memory. The volatile memory 15b stores instructions for execution by the CPU 15a and data used by those instructions. For example, in use, the instructions defining operations of the calculation blocks simulating propagation of the wave 2 in the domain 1 may be stored in the volatile memory 15b. Additionally, data defining spaces 6, 7, 8, 9 and data defining locations of the computation blocks 3 may be stored in the volatile memory 15b.

The computer 15 further comprises non-volatile storage in the form of a hard disc drive 15c. The computer 15 further comprises an I/O interface 15d to which are connected peripheral devices used in connection with the computer 15. More particularly, a display 15e is configured so as to display output from the computer 15. The display 15e may, for example, display a representation of the propagation of the wave 2 in the domain 1. Additionally, the display 15e may display a graph showing values of calculation blocks 3 over time. Input devices are also connected to the I/O interface 15d. Such input devices include a keyboard 15f and a mouse 15g which allow user interaction with the computer 15. A network interface 15h allows the computer 15 to be connected to an appropriate computer network so as to receive and transmit data from and to other computing devices. The CPU 15a, volatile memory 15b, hard disc drive 15c, I/O interface 15d, and network interface 15h, are connected together by a bus 15i.

In general, propagation of the wave 2 in the domain 1 is initiated at a time step 0 in which each calculation block 3 has a value 0 by setting values of some of one of the vector field components in part of the space 6 to a non-zero value. The non-zero values simulate an initial state of the wave 2 in the domain 1, and propagation of the wave from the initial state is calculated as set out in detail below, with values for one of the magnetic and electric vector field components being calculated at each iteration.

Figure 2:
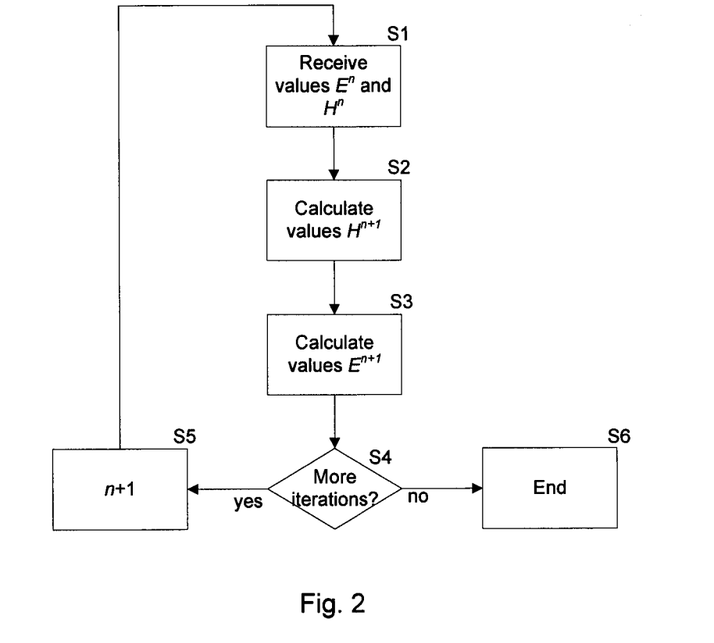
FIG. 2 is a flowchart showing processing carried out to perform iterations to update values associated with points in the domain of FIG. 1.

FIG. 2 shows processing carried out to update the domain 1 so as to simulate propagation of a wave at a time stamp (t>0). The domain 1 is updated for a single time step in two stages, modelled by two half-iterations, first calculating magnetic field vector components $H^{n+1}$ based upon electric field vector components $E^n$ and subsequently calculating electric field vector components $E^{n+1}$ based upon magnetic field vector components $H^{n+1}$, where $E^n$ indicates E at time stamp n and $H^{n+1}$ indicates H at time stamp (n+½) (and correspondingly, $H^n$ indicates H at time stamp (n−½)). That is, at a first time point all of one of the values E and H are updated, and at a further half time point, all of the other of the values E and H are updated.

In more detail, at step S1 values $E^n$ and $H^n$ are received indicating electric field vector components at a plurality of locations in domain 1 at time stamp n. At step S2 values Fri are determined based upon values $E^n$ and $H^n$ received at step S1. The values $H^{n+1}$ indicate magnetic field vector components at a plurality of locations in domain 1 at time stamp (n+½). At step S3 values $E^{n+1}$ are determined based upon values $H^{n+1}$ determined at step S2 and values $E^n$. The values $E^{n+1}$ indicate electric field vector components at a plurality of locations in domain 1 at time stamp (n+1). At step S4 it is determined if more iterations are to be performed and if more iterations are to be performed then at step S5 the value n is incremented. Processing from step S5 continues at steps S1 to S4 where a further iteration is carried out so as to determine propagation of the wave 2 in the domain 1 at a further time. Otherwise, if it is determined at step S4 that no further iterations are to be performed, processing ends at step S6.

It has been described above that magnetic field vector component values at a plurality of locations in domain 1, $H^{n+1}$, are determined at step S2 of FIG. 2, and that electric field vector component values at a plurality of locations in domain 1, $E^{n+1}$, are determined at step S3 of FIG. 2. The magnetic field vector components consist of x, y and z values, $H_x$, $H_y$ and $H_z$ respectively, each component having a location defined by coordinates (i,j,k), and electric field vector components similarly consist of components $E_x$, $E_y$ and $E_z$. In a similar way to time steps being modelled by two half-iterations, due to the fact that the domain 1 models a continuous wave by discretising the wave into two vector components (E and H), points in space are modelled by half-points. As such, in the following the notation $H_x(i,j,k)$ will be used to indicate $H_x$ at (i,j+½,k), $H_y(i,j,k)$ will be used to indicate $H_y$ at (i+½,j,k) and $H_z(i,j,k)$ will be used to indicate $H_z$ at (i+½,j+½,k−½). The notation $E_x(i,j,k)$ will be used to indicate $E_x$ at (i+½,j,k−½), $E_y(i,j,k)$ will be used to indicate $E_y$ at (i,j+½,k−½) and $E_z(i,j,k)$ will be used to indicate $E_z$ at (i,j,k). It will be appreciated that alternative definitions of the notation can be used, as discussed in further detail below.

In general terms, each value $H_w^{n+1}(i,j,k)$ and $E_w^{n+1}(i,j,k)$, where w is x, y or z, is determined based upon values lying in the plane indicated by w. That is, for example, the value $H_x^{n+1}(i,j,k)$ is determined based upon $E^n$ values located at points surrounding $H_x(i,j,k)$ in the x plane, and therefore having x-coordinate value i, whilst y-coordinate values and z-coordinate values vary from the corresponding coordinate values of $H_x(i,j,k)$.

Figure 3:
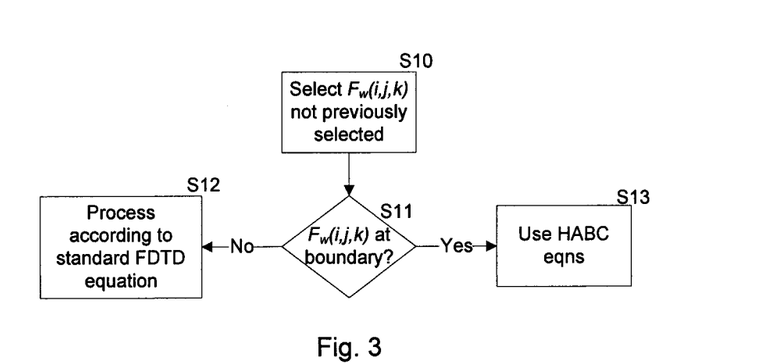
FIG. 3 is a flowchart showing processing carried out to select an equation to be used to generate a value at a point in the domain of FIG. 1.

Processing to determine a set of values $F^{n+1}$ where F is either H or E will now be described with reference to FIG. 3. At step S10 a point $F_w(i,j,k)$ that has not previously been processed is selected and at step S11 it is determined whether $F_w(i,j,k)$ lies adjacent to a HABC boundary (corresponding to boundaries 5 and 11 of FIG. 1). A point $F_w(i,j,k)$ lies adjacent to a boundary if one of the values i, j, k is equal to a value $tl_{min}±1$ or a value $tl_{max}±1$ and as such, the values $tl_{min}$ and $tl_{max}$ define the HABC boundaries.

If it is determined that $F_w(i,j,k)$ does not lie adjacent to a boundary then at step S12 the value $F_w^{n+1}(i,j,k)$ is determined according to one of the standard FDTD equations set out below in equations (1) to (6), the appropriate FDTD equation being selected based upon the values F and w. Otherwise the point $F_w(i,j,k)$ lies adjacent to the boundary, and at step S13 the value $F_w^{n+1}(i,j,k)$ is determined according to one of the HABC equations set out below in equations (7), (10) and (13) for magnetic vector components and (16), (19) and (22) for electric vector components, the appropriate HABC equation again being determined based upon the values F and w.

A three-dimensional FDTD space is defined as a rectangular parallelepiped with eight corners having locations ($i_{min}$, $j_{min}$,$k_{min}$), ($i_{max}$,$j_{min}$,$k_{min}$), ($i_{min}$,$j_{max}$,$k_{min}$), $i_{min}$,$j_{min}$,$k_{max}$), ($i_{max}$,$j_{max}$,$k_{min}$), ($i_{min}$,$j_{max}$,$k_{max}$), ($i_{max}$,$j_{min}$,$k_{max}$), ($i_{max}$,$j_{max}$, $k_{max}$), with distance $\Delta x_{(i)}$ between $E_z(i,j,k)$ and $E_z(i+1,j,k)$, distance $\Delta y_{(j)}$ between $E_z(i,j,k)$ and $E_z(i,j+1,k)$ and distance $\Delta z_{(k)}$ between $E_z(i,j,k)$ and $E_z(i,j,k+1)$. The HABC boundaries of the FDTD space are defined by planes $i_{tl_{min}}$, $i_{tl_{max}}$, $j_{tl_{min}}$, $j_{tl_{max}}$, $k_{tl_{min}}$, and $k_{tl_{max}}$ which define maximum and minimum values in each of the i, j and k dimensions for points that lie within the space 6 for which propagation of the wave 2 is to be simulated. That is, any point $F_w(i, j, k)$ for which one of the values i, j or k does not lie between the respective $tl_{min}$ and $tl_{max}$ value, lies in one of the additional spaces 7, 8, 9 indicated in FIG. 1.

The FDTD space is modelled to have permeability μ and permittivity ε. The computation of the magnetic field H for all points not lying adjacent to the boundary of the region is as defined in equations (1), (2) and (3) below, for magnetic field vector components $H_x$, $H_y$ and $H_z$ respectively.

$$H_x^{n+1}(i, j, k) = H_x^n(i, j, k) + \quad (1)$$
$$\frac{\Delta t}{\mu}\left[\frac{E_y^n(i, j, k+1) - E_y^n(i, j, k)}{\frac{\Delta z_{(k-1)} + \Delta z_{(k)}}{2}} - \frac{E_z^n(i, j+1, k) - E_z^n(i, j, k)}{\Delta y_{(j)}}\right]$$
$$[i_{min} + 1 \leq i \leq i_{max} - 1, j_{min} \leq j \leq j_{max} - 1, k_{min} \leq k \leq k_{max} - 1]$$

$$H_y^{n+1}(i, j, k) = H_y^n(i, j, k) + \quad (2)$$
$$\frac{\Delta t}{\mu}\left[\frac{E_z^n(i+1, j, k) - E_z^n(i, j, k)}{\Delta x_{(i)}} - \frac{E_x^n(i, j, k+1) - E_x^n(i, j, k)}{\frac{\Delta z_{(k-1)} + \Delta z_{(k)}}{2}}\right]$$
$$[i_{min} \leq i \leq i_{max} - 1, j_{min} + 1 \leq j \leq j_{max} - 1, k_{min} \leq k \leq k_{max} - 1]$$

$$H_z^{n+1}(i, j, k) = H_z^n(i, j, k) + \quad (3)$$
$$\frac{\Delta t}{\mu}\left[\frac{E_x^n(i, j+1, k) - E_x^n(i, j, k)}{\Delta y_{(j)}} - \frac{E_y^n(i+1, j, k) - E_y^n(i, j, k)}{\Delta x_{(i)}}\right]$$
$$[i_{min} \leq i \leq i_{max} - 1, j_{min} \leq j \leq j_{max} - 1, k_{min} + 1 \leq k \leq k_{max} - 1]$$

The computation of the electric field E is as defined in equations (4), (5) and (6) below for electric field vector components $E_x$, $E_y$ and $E_z$ respectively.

$$E_x^{n+1}(i, j, k) = E_x^n(i, j, k) + \frac{\Delta t}{\varepsilon}\left[\frac{H_z^{n+1}(i, j, k) - H_z^{n+1}(i, j-1, k)}{\frac{\Delta y_{(j-1)} + \Delta y_{(j)}}{2}} - \frac{H_y^{n+1}(i, j, k) - H_y^{n+1}(i, j, k-1)}{\Delta z_{(k)}}\right] \quad (4)$$
$$[i_{min} \leq i \leq i_{max} - 1, j_{min} + 1 \leq j \leq j_{max} - 1, k_{min} + 1 \leq k \leq k_{max} - 1]$$

$$E_y^{n+1}(i, j, k) = E_y^n(i, j, k) + \frac{\Delta t}{\varepsilon}\left[\frac{H_x^{n+1}(i, j, k) - H_x^{n+1}(i, j, k-1)}{\Delta z_{(k)}} - \frac{H_z^{n+1}(i, j, k) - H_z^{n+1}(i-1, j, k)}{\frac{\Delta x_{(i-1)} + \Delta x_{(i)}}{2}}\right] \quad (5)$$
$$[i_{min} + 1 \leq i \leq i_{max} - 1, j_{min} \leq j \leq j_{max} - 1, k_{min} + 1 \leq k \leq k_{max} - 1]$$

$$E_z^{n+1}(i, j, k) = E_z^n(i, j, k) + \frac{\Delta t}{\varepsilon}\left[\frac{H_y^{n+1}(i, j, k) - H_y^{n+1}(i-1, j, k)}{\frac{\Delta x_{(i-1)} + \Delta x_{(i)}}{2}} - \frac{H_x^{n+1}(i, j, k) - H_x^{n+1}(i, j-1, k)}{\frac{\Delta y_{(j-1)} + \Delta y_{(j)}}{2}}\right] \quad (6)$$
$$[i_{min} + 1 \leq i \leq i_{max} - 1, j_{min} + 1 \leq j \leq j_{max} - 1, k_{min} \leq k \leq k_{max} - 1]$$

It should be noted that the ranges defined for each of the values i, j, k (indicated in square brackets below each equation) vary for each of equations (1) to (6) due to the fact that each plane (defined by setting one of the values i, j, k to a constant value) only contains values of some of the H and E vector components. It is of course possible to define the FDTD space such that different planes contain values of different vector components, as will be described in further detail below. Additionally, the definitions of ranges of values for which each of the equations is valid do not consider those values for points which lie adjacent to a boundary and for which HABC equations are used in place of equations (1) to (6), as explained in detail below. As such, not every point having a value in the range of values will use one of equations (1) to (6).

As indicated above, for points (i,j,k) lying adjacent to the boundary, values are determined using HABC equations which are modified versions of the above equations. In general terms the HABC equations are modified so that for a point $F_w^{n+1}(i, j, k)$ lying adjacent to the boundary and on the inside of the space 6 for which propagation of the wave 2 is to be simulated, values from adjacent points lying adjacent to the boundary and on the outside of the space 6 are used to estimate a vector field lying on the boundary which has equal size and opposite sign to the vector field that is projected towards the boundary. The estimated vector field is added when the updated value for the point $F_w^{n+1}(i, j, k)$ is calculated and, given that the estimated vector field has equal size and opposite sign to the vector field projected towards the boundary from the point $F_w^{n+1}(i, j, k)$, cancels the projected vector field at the boundary. Similarly, for a point $F_w^{n+1}(i, j, k)$ lying adjacent to the boundary and on the outside of the space 6 for which propagation of the wave 2 is to be simulated, values from adjacent points lying adjacent to the boundary and on the inside of the space 6 are used to estimate a vector field lying on the boundary which is again added when the updated value for the point $F_w^{n+1}(i, j, k)$ is calculated which serves to cancel the projected vector field at the boundary.

Points lying adjacent to HABC extensions 11 are determined in the same way as points lying adjacent to HABC boundaries that bound space 6. That is, points lying outside space 6, but on the same side as space 6 of an HABC boundary extension (e.g. points X) have values from adjacent points lying on the opposite side of the HABC boundary used to estimate a vector field lying on the boundary which has equal size and opposite sign to the vector field that is projected towards the boundary added when updated, and points lying outside space 6, and on the opposite side to space 6 (e.g. points Y) of an HABC boundary extension have values from adjacent points lying on the inside of the HABC boundary used to estimate a vector field lying on the boundary which is again added when updated so as to cancel the projected vector field at the boundary.

As indicated above, adding estimated values for vector fields having equal size and opposite sign in this way simulates projection of an equal and opposite field into the space at the boundary which, according to the equivalence theorem of electromagnetics, cancels the field projected towards the boundary, and results in no reflection of the wave into the space 6 from the boundary 5. The vector field that is projected from the HABC is estimated as it cannot be computed at the location of the Huygens surface and additionally cannot be known a priori.

It should of course be noted that whilst the above description indicates that points lie adjacent to a boundary, the boundary simply acts to indicate points that are determined according to particular equations, and as such may take the form of values indicating points in a domain 1 that are determined according to HABC equations, and the particular HABC equations that should be used for the points. That is, all that is required to be stored is a location of the boundary, and no representation of the boundary is required.

In more detail, for points lying at the boundary, values $H^{n+1}(i,j,k)$ are computed according to HABC equations shown in equations (7), (10) and (13) below.

$$H_x^{n+1}(i, j, k) = H_x^n(i, j, k) + \frac{\Delta t}{\mu} \left[ \begin{array}{c} \dfrac{E_y^n(i, j, k+1) - \tilde{E}_y^{\tilde{n}}(i, j, k+1) - \left(E_y^n(i, j, k) - \tilde{E}_y^{\tilde{n}}(i, j, k)\right)}{\dfrac{\Delta z_{(k-1)} + \Delta z_{(k)}}{2}} \\ \dfrac{E_z^n(i, j+1, k) - \tilde{E}_z^{\tilde{n}}(i, j+1, k) - \left(E_z^n(i, j, k) - \tilde{E}_z^{\tilde{n}}(i, j, k)\right)}{\Delta y_{(j)}} \end{array} \right] \quad (7)$$

$$[i_{min} + 1 \le i \le i_{max} - 1,$$
$$j + 1 = j_{tl_{min}}, j = j_{tl_{max}}, k + 1 = k_{tl_{min}}, k = k_{tl_{max}}]$$

where:

$\tilde{E}_z^{\tilde{n}}$ is determined according to equation (8) below:

$$\tilde{E}_z^{\tilde{n}}(i, j, k) = \quad (8)$$
$$E_z^{n-1}(i, j \pm 1, k) + \frac{\Delta t - \Delta y_{(j)}\sqrt{\varepsilon\mu}}{\Delta t + \Delta y_{(j)}\sqrt{\varepsilon\mu}}\left(E_z^n(i, j \pm 1, k) - \tilde{E}_z^{\tilde{n}-1}(i, j, k)\right)$$

$$\left[ \begin{array}{c} i_{min} + 1 \le i \le i_{max} - 1, j = j_{tl_{min}} \text{ for } + \text{ sign,} \\ j_{tl_{max}} \text{ for } - \text{ sign and } k_{min} \le k \le k_{max} - 1 \end{array} \right]$$

and $\tilde{E}_y^{\tilde{n}}$ is determined according to equation (9) below.

$$\tilde{E}_y^{\tilde{n}}(i, j, k) = \quad (9)$$
$$E_y^{n-1}(i, j, k \pm 1) + \frac{\Delta t - \Delta z_{(k)}\sqrt{\varepsilon\mu}}{\Delta t + \Delta z_{(k)}\sqrt{\varepsilon\mu}}\left(E_y^n(i, j, k \pm 1) - \tilde{E}_y^{\tilde{n}-1}(i, j, k)\right)$$

$$\left[ \begin{array}{c} i_{min} + 1 \le i \le i_{max} - 1, j_{min} \le j \le j_{max} - 1, \\ k = k_{tl_{min}} \text{ for } + \text{ sign, } k_{tl_{max}} \text{ for } - \text{ sign} \end{array} \right]$$

$$H_y^{n+1}(i, j, k) = H_y^n(i, j, k) + \frac{\Delta t}{\mu} \left[ \begin{array}{c} \dfrac{E_z^n(i+1, j, k) - \tilde{E}_z^{\tilde{n}}(i+1, j, k) - \left(E_z^n(i, j, k) - \tilde{E}_z^{\tilde{n}}(i, j, k)\right)}{\Delta x_{(j)}} \\ \dfrac{E_x^n(i, j, k+1) - \tilde{E}_x^{\tilde{n}}(i, j, k+1) - \left(E_x^n(i, j, k) - \tilde{E}_x^{\tilde{n}}(i, j, k)\right)}{\dfrac{\Delta z_{(k-1)} + \Delta z_{(k)}}{2}} \end{array} \right] \quad (10)$$

$$\left[ \begin{array}{c} i + 1 = i_{tl_{min}}, i = i_{tl_{max}}, j_{min} + 1 \le j \le j_{max} - 1, \\ k + 1 = k_{tl_{min}}, k = k_{tl_{max}} \end{array} \right]$$

where:

$\tilde{E}_z^{\tilde{n}}$ is determined according to equation (11):

$$\tilde{E}_z^{\tilde{n}}(i, j, k) = \quad (11)$$
$$E_z^{n-1}(i \pm 1, j, k) + \frac{\Delta t - \Delta x_{(i)}\sqrt{\varepsilon\mu}}{\Delta t + \Delta x_{(i)}\sqrt{\varepsilon\mu}}\left(E_z^n(i \pm 1, j, k) - \tilde{E}_z^{\tilde{n}-1}(i, j, k)\right)$$

$$\left[ \begin{array}{c} i = i_{tl_{min}} \text{ for } + \text{ sign, } i_{tl_{max}} \text{ for } - \text{ sign,} \\ j_{min} + 1 \le j \le j_{max} - 1 \text{ and } k_{min} \le k \le k_{max} - 1 \end{array} \right]$$

and $\tilde{E}_x^{\tilde{n}}$ is determined according to equation (12) below.

$$\tilde{E}_x^{\tilde{n}}(i, j, k) = \quad (12)$$
$$E_x^{n-1}(i, j, k \pm 1) + \frac{\Delta t - \Delta z_{(k)}\sqrt{\varepsilon\mu}}{\Delta t + \Delta z_{(k)}\sqrt{\varepsilon\mu}}\left(E_x^n(i, j, k \pm 1) - \tilde{E}_x^{\tilde{n}-1}(i, j, k)\right)$$

$$\left[ \begin{array}{c} i_{min} \le i \le i_{max} - 1, j_{min} + 1 \le j \le j_{max} - 1 \text{ and} \\ k = k_{tl_{min}} \text{ for } + \text{ sign, } k_{tl_{max}} \text{ for } - \text{ sign} \end{array} \right]$$

$$H_z^{n+1}(i, j, k) = H_z^n(i, j, k) + \quad (13)$$
$$\frac{\Delta t}{\mu} \left[ \begin{array}{c} \dfrac{E_x^n(i, j+1, k) - \tilde{E}_x^{\tilde{n}}(i, j+1, k) - \left(E_x^n(i, j, k) - \tilde{E}_x^{\tilde{n}}(i, j, k)\right)}{\Delta y_{(j)}} \\ \dfrac{E_y^n(i+1, j, k) - \tilde{E}_y^{\tilde{n}}(i+1, j, k) - \left(E_y^n(i, j, k) - \tilde{E}_y^{\tilde{n}}(i, j, k)\right)}{\Delta x_{(i)}} \end{array} \right]$$

$$\left[ \begin{array}{c} i + 1 = i_{tl_{min}}, i = i_{tl_{max}}, j + 1 = j_{tl_{min}}, \\ j = j_{tl_{max}}, k_{min} + 1 \le k \le k_{max} - 1 \end{array} \right]$$

where:

$\tilde{E}_x^{\tilde{n}}$ is determined according to equation (14) below:

$$\tilde{E}_x^{\tilde{n}}(i, j, k) = \quad (14)$$
$$E_x^{n-1}(i, j \pm 1, k) + \frac{\Delta t - \Delta y_{(j)}\sqrt{\varepsilon\mu}}{\Delta t + \Delta y_{(j)}\sqrt{\varepsilon\mu}}\left(E_x^n(i, j \pm 1, k) - \tilde{E}_x^{\tilde{n}-1}(i, j, k)\right)$$

$$\left[ \begin{array}{c} i_{min} + 1 \le i \le i_{max} - 1, j = j_{tl_{min}} \text{ for } + \text{ sign,} \\ j_{tl_{max}} \text{ for } - \text{ sign and } k_{min} + 1 \le k \le k_{max} - 1 \end{array} \right]$$

and $\tilde{E}_y^{\tilde{n}}$ is determined according to equation (15) below.

$$\tilde{E}_y^{\tilde{n}}(i, j, k) = \quad (15)$$
$$E_y^{n-1}(i \pm 1, j, k) + \frac{\Delta t - \Delta x_{(i)}\sqrt{\varepsilon\mu}}{\Delta t + \Delta x_{(i)}\sqrt{\varepsilon\mu}}\left(E_y^n(i \pm 1, j, k) - \tilde{E}_y^{\tilde{n}-1}(i, j, k)\right)$$

$$\left[ \begin{array}{c} i = i_{tl_{min}} \text{ for } + \text{ sign, } i_{tl_{max}} \text{ for } - \text{ sign,} \\ j_{min} \le j \le j_{max} - 1, k_{min} + 1 \le k \le k_{max} - 1 \end{array} \right]$$

Note that the definition of the range of values i, j, k for equations (7), (10) and (13) define those points in the respective plane that lie at the boundary. The definition of $tl_{min}$ and $tl_{max}$ coordinates in each of equations (8), (9), (11), (12), (14) and (15) is such that the point containing the $tl_{min}$ or $tl_{max}$ coordinate lies just inside the HABC boundary.

Similarly, values $E^{n+1}(i,j,k)$ are computed for points lying at the boundary according to HABC equations shown in equations (16), (19) and (22) below:

$$E_x^{n+1}(i, j, k) = \quad (16)$$

-continued $$E_x^n(i,j,k) + \frac{\Delta t}{\varepsilon} \begin{bmatrix} H_z^{n+1}(i,j,k) + \tilde{H}_z^{\tilde{n}+1}(i,j,k) - \\ \dfrac{\left(H_z^{n+1}(i,j-1,k) + \tilde{H}_z^{\tilde{n}+1}(i,j-1,k)\right)}{\dfrac{\Delta y_{(j-1)} + \Delta y_{(j)}}{2}} \\ H_y^{n+1}(i,j,k) + \tilde{H}_y^{\tilde{n}+1}(i,j,k) - \\ \dfrac{\left(H_y^{n+1}(i,j,k-1) + \tilde{H}_y^{\tilde{n}+1}(i,j,k-1)\right)}{\Delta z_{(k)}} \end{bmatrix}$$

$[i_{min} \le i \le i_{max} - 1, j = j_{tl_{min}}, j = j_{tl_{max}}, k = k_{tl_{min}}, k = k_{tl_{max}}]$ where:

$\tilde{H}_z^{\tilde{n}+1}$ is determined according to equation (17) below:

$$\tilde{H}_z^{\tilde{n}+1}(i,j,k) = \qquad (17)$$

$$H_z^n(i, j \pm 1, k) + \frac{\Delta t - \Delta y_{(j)}\sqrt{\varepsilon\mu}}{\Delta t + \Delta y_{(j)}\sqrt{\varepsilon\mu}}\left(H_z^{n+1}(i, j \pm 1, k) - \tilde{H}_z^{\tilde{n}}(i,j,k)\right)$$

$\begin{bmatrix} i_{min} \le i \le i_{max} - 1, j = j_{tl_{min}} - 1 \text{ for } + \text{ sign,} \\ j_{tl_{max}} \text{ for } - \text{ sign and } k_{min} + 1 \le k \le k_{max} - 1 \end{bmatrix}$ and $\tilde{H}_y^{\tilde{n}+1}$ is determined according to equation (18) below.

$$\tilde{H}_y^{\tilde{n}+1}(i,j,k) = \qquad (18)$$

$$H_y^n(i, j, k \pm 1) + \frac{\Delta t - \Delta z_{(k)}\sqrt{\varepsilon\mu}}{\Delta t + \Delta z_{(k)}\sqrt{\varepsilon\mu}}\left(H_z^{n+1}(i,j,k \pm 1) - \tilde{H}_y^{\tilde{n}}(i,j,k)\right)$$

$\begin{bmatrix} i_{min} \le i \le i_{max} - 1, j_{min} + 1 \le j \le j_{max} - 1, \\ k = k_{tl_{min}} - 1 \text{ for } + \text{ sign, } k_{tl_{max}} \text{ for } - \text{ sign} \end{bmatrix}$ $$E_y^{n+1}(i,j,k) = \qquad (19)$$

$$E_y^n(i,j,k) + \frac{\Delta t}{\varepsilon} \begin{bmatrix} H_x^{n+1}(i,j,k) + \tilde{H}_x^{\tilde{n}+1}(i,j,k) - \\ \dfrac{\left(H_x^{n+1}(i,j,k-1) + \tilde{H}_x^{\tilde{n}+1}(i,j,k-1)\right)}{\Delta z_{(k)}} - \\ H_z^{n+1}(i,j,k) + \tilde{H}_z^{\tilde{n}+1}(i,j,k) - \\ \dfrac{\left(H_z^{n+1}(i-1,j,k) + \tilde{H}_z^{\tilde{n}+1}(i-1,j,k)\right)}{\dfrac{\Delta x_{(i-1)} + \Delta x_{(i)}}{2}} \end{bmatrix}$$

$[i = i_{tl_{min}}, i = i_{tl_{max}}, j_{min} \le j \le j_{max} - 1, k = k_{tl_{min}}, k = k_{tl_{max}}]$ where:

$\tilde{H}_x^{\tilde{n}+1}$ is determined according to equation (20) below:

$$\tilde{H}_x^{\tilde{n}+1}(i,j,k) = \qquad (20)$$

$$H_x^n(i, j, k \pm 1) + \frac{\Delta t - \Delta z_{(k)}\sqrt{\varepsilon\mu}}{\Delta t + \Delta z_{(k)}\sqrt{\varepsilon\mu}}\left(H_x^{n+1}(i, j, k \pm 1) - \tilde{H}_x^{\tilde{n}}(i,j,k)\right)$$

$\begin{bmatrix} i_{min} + 1 \le i \le i_{max} - 1, j_{min} \le j \le j_{max} - 1, \\ k = k_{tl_{min}} - 1 \text{ for } + \text{ sign, } k_{tl_{max}} \text{ for } - \text{ sign} \end{bmatrix}$ and $\tilde{H}_z^{\tilde{n}+1}$ is determined according to equation (21) below.

$$\tilde{H}_z^{\tilde{n}+1}(i,j,k) = \qquad (21)$$

$$H_z^n(i \pm 1, j, k) + \frac{\Delta t - \Delta x_{(i)}\sqrt{\varepsilon\mu}}{\Delta t + \Delta x_{(i)}\sqrt{\varepsilon\mu}}\left(H_z^{n+1}(i \pm 1, j, k) - \tilde{H}_z^{\tilde{n}}(i,j,k)\right)$$

$\begin{bmatrix} i = i_{tl_{min}} - 1 \text{ for } + \text{ sign, } i_{tl_{max}} \text{ for } - \text{ sign,} \\ j_{min} \le j \le j_{max} - 1, k_{min} + 1 \le k \le k_{max} - 1 \end{bmatrix}$ $$E_z^{n+1}(i,j,k) = \qquad (22)$$

$$E_z^n(i,j,k) + \frac{\Delta t}{\varepsilon} \begin{bmatrix} H_y^{n+1}(i,j,k) + \tilde{H}_y^{\tilde{n}+1}(i,j,k) - \\ \dfrac{\left(H_y^{n+1}(i-1,j,k) + \tilde{H}_y^{\tilde{n}+1}(i-1,j,k)\right)}{\dfrac{\Delta x_{(i-1)} + \Delta x_{(i)}}{2}} \\ H_x^{n+1}(i,j,k) + \tilde{H}_x^{\tilde{n}+1}(i,j,k) - \\ \dfrac{\left(H_x^{n+1}(i,j-1,k) + \tilde{H}_x^{\tilde{n}+1}(i,j-1,k)\right)}{\dfrac{\Delta y_{(j-1)} + \Delta y_{(j)}}{2}} \end{bmatrix}$$

$[i = i_{tl_{min}}, i = i_{tl_{max}}, j = j_{tl_{min}}, j = j_{tl_{max}}, k_{min} \le k \le k_{max} - 1]$ where:

$\tilde{H}_y^{\tilde{n}+1}$ is determined according to equation (23) below:

$$\tilde{H}_y^{\tilde{n}+1}(i,j,k) = \qquad (23)$$

$$H_y^n(i \pm 1, j, k) + \frac{\Delta t - \Delta x_{(i)}\sqrt{\varepsilon\mu}}{\Delta t + \Delta x_{(i)}\sqrt{\varepsilon\mu}}\left(H_y^{n+1}(i \pm 1, j, k) - \tilde{H}_y^{\tilde{n}}(i,j,k)\right)$$

$\begin{bmatrix} i = i_{tl_{min}} - 1 \text{ for } + \text{ sign, } i_{tl_{max}} \text{ for } - \text{ sign,} \\ j_{min} + 1 \le j \le j_{max} - 1, k_{min} \le k \le k_{max} - 1 \end{bmatrix}$ and $\tilde{H}_x^{\tilde{n}+1}$ is determined according to equation (24) below.

$$\tilde{H}_x^{\tilde{n}+1}(i,j,k) = \qquad (24)$$

$$H_x^n(i, j \pm 1, k) + \frac{\Delta t - \Delta y_{(j)}\sqrt{\varepsilon\mu}}{\Delta t + \Delta y_{(j)}\sqrt{\varepsilon\mu}}\left(H_x^{n+1}(i, j \pm 1, k) - \tilde{H}_x^{\tilde{n}}(i,j,k)\right)$$

$\begin{bmatrix} i_{min} + 1 \le i \le i_{max} - 1, j = j_{tl_{min}} - 1 \text{ for } + \text{ sign,} \\ j_{tl_{max}} \text{ for } - \text{ sign, } k_{min} \le k \le k_{max} - 1 \end{bmatrix}$ Again, the definition of the range of values i, j, k for equations (16), (19) and (22) define those points in the respective plane that lie at the boundary and the definition of $tl_{min}$, and $tl_{max}$, coordinates in each of equations (17), (18), (20), (21), (23) and (24) is such that the point containing the $tl_{min}$, or $tl_{max}$ coordinate lies just outside the HABC boundary.

In each of equations (7), (10), (13), (16), (19) and (22), the values $\tilde{E}_w^{\tilde{n}}$ and $\tilde{H}_w^{\tilde{n}+1}$ correspond to an estimate of a respective part of the electric and magnetic vector field component of equal magnitude and opposite sign to the corresponding part of the vector field component ($E_w^n$ and $H_w^{n+1}$) projected towards the boundary from the point $F_w^{n+1}(i,j,k)$. Since each vector field component projected towards the boundary is cancelled by an estimated equal and opposite vector field component projected from the boundary, the total field projected towards the boundary is cancelled and reflection of the wave into the space 7 is prevented.

It can be noted that estimated vector field components $\tilde{E}_w^{\tilde{n}}$ are subtracted in each of equations (7), (10) and (13), and estimated vector field components $\tilde{H}_w^{\tilde{n}+1}$ are added in each of equations (16), (19) and (22). This is due to the difference in direction of projection of the estimated vector field component from the boundary, resulting from points $H_w$ and $E_w$, lying on different sides of the boundary to each other, given the definition of the domain 1.

Figure 4:
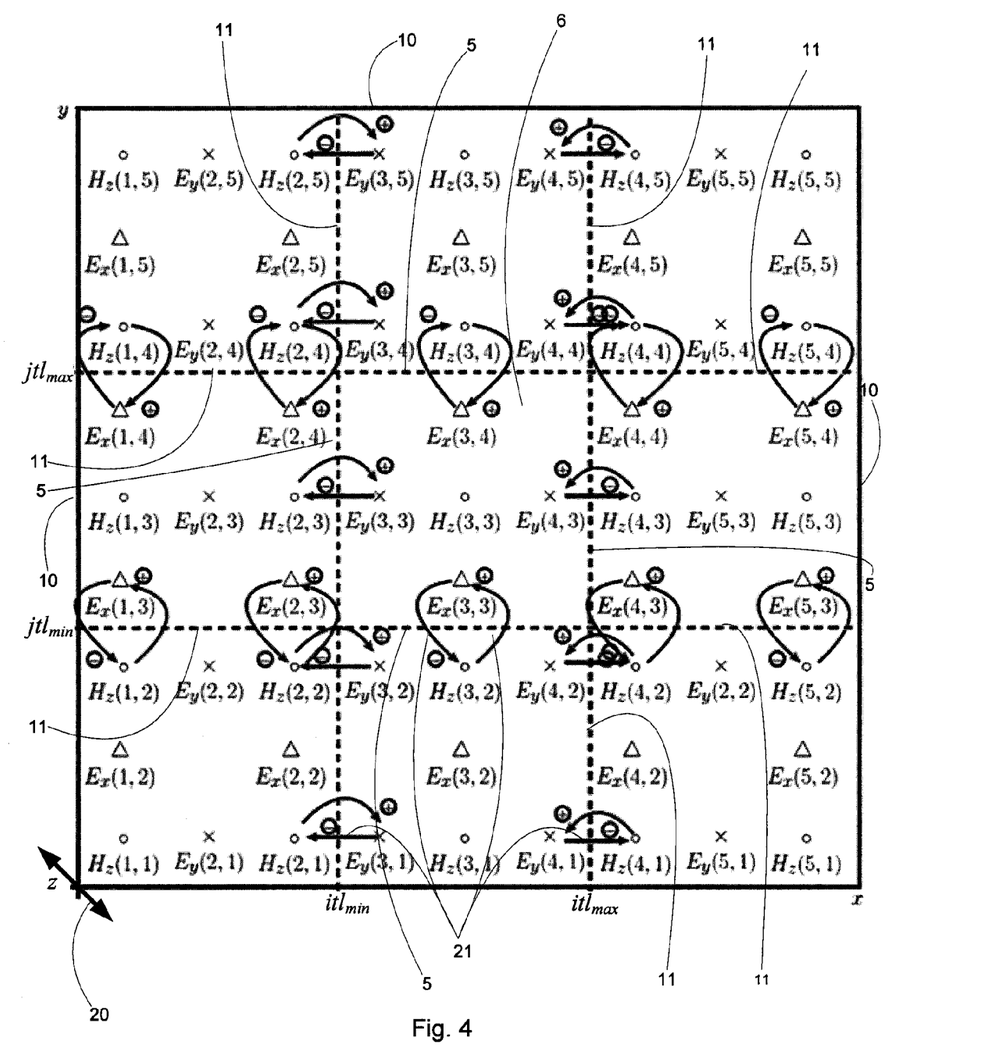
FIG. 4 is a schematic illustration of a cross section of an FDTD domain on a constant plane.

Referring now to FIG. 4, a cross section of a 5×5×5 FDTD space on a k=constant plane is shown (where dimension z is indicated by arrows 20 but is not shown, and points shown do not include coordinate k given that k=constant). Minimum values for points that lie within the space 6 for which propagation of the wave 2 is to be simulated, $i_{tl_{min}}$ and $j_{tl_{min}}$ have value 3 and maximum values $i_{tl_{max}}$ and $j_{tl_{max}}$ have value 4. That is, lines itl$_{min}$ and jtl$_{min}$ indicating lower HABC boundaries indicate that points having i or j values less than 3 lie outside space 6 and lines itl$_{max}$ and jtl$_{max}$ indicating upper HABC boundaries indicate that points having i and j coordinates greater than 4 lie outside space 6. Lines 5 indicate HABC boundaries, and lines 11 indicate HABC boundary extensions.

Figure 5:
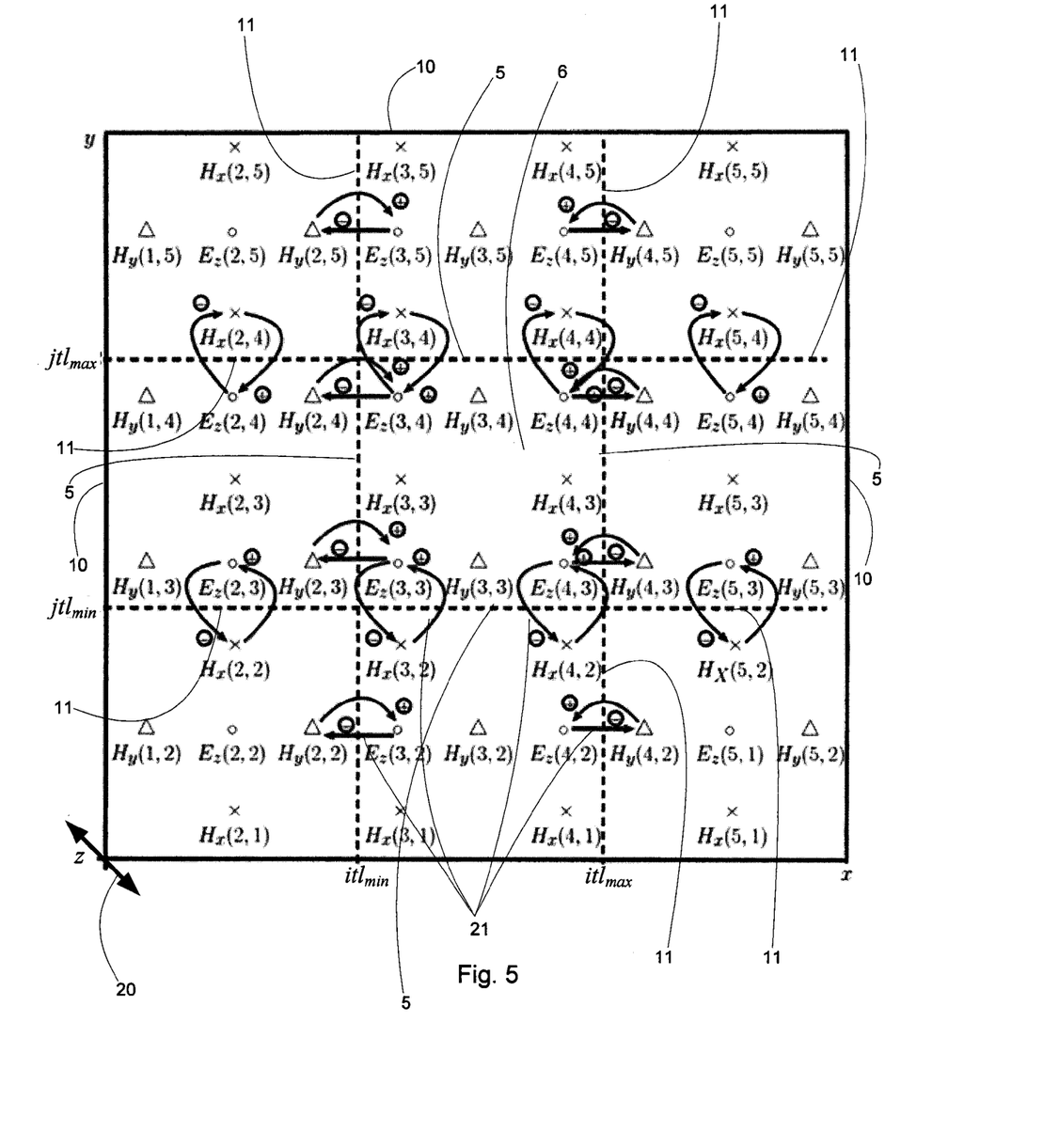
FIG. 5 is a schematic illustration of a cross section of the FDTD domain of FIG. 4 on a constant plane different to the plane of FIG. 4.

Values $H_z$ are determined based upon adjacent values $E_x$ and $E_y$ which, given the definition of the relationship between the notation and coordinates set out above, each have the same value k as $H_z$. Correspondingly, values $E_x$ are determined based upon values $H_z$ and $H_y$, with $H_y$ not shown in FIG. 4 given that points $H_y$ adjacent to points $E_x$ lie in k-planes±½ the k-plane shown. A k-plane offset by +0.5Δz relative to the plane of FIG. 4 is shown in FIG. 5. Other values are determined similarly, based upon adjacent points lying in a plane determined by the values x, y, and z.

In order to compute points which lie at a boundary 10, indicating a perfectly electric conducting boundary, a value 0 is used which corresponds to a perfectly electric conductive condition. For example, the value $H_z(1,3)$ shown in FIG. 4 is determined based upon values $E_x(1,4)$, $E_x(1,3)$, $E_y(2,3)$ and 0, which value takes the place of what would be $E_y(1,3)$ if the point did not lie outside of the domain.

A plurality of arrows 21 in each of FIGS. 4 and 5 indicate the influence of points caused by the HABC equations upon points lying at the HABC boundaries 11. Each arrow has an associated circle containing either a + or − sign, indicating that the point at the origin of the arrow influences the point at the end of the arrow positively or negatively respectively.

The above definition of the domain and corresponding equations provides one of three possible three-dimensional domains. The first of the two possible three-dimensional domains, known as the first permutation, is determined by changing x, y and z and $i_{tl_{min}}$, $i_{tl_{max}}$, $j_{tl_{min}}$ and $j_{tl_{max}}$ to y, z and x and $j_{tl_{min}}$, $j_{tl_{max}}$, $k_{tl_{min}}$ and $k_{tl_{max}}$ respectively in the definition of the domain and each of equations (1) to (24). The second permutation is determined by changing x, y and z and $i_{tl_{min}}$, $i_{tl_{max}}$, $j_{tl_{min}}$ and $j_{tl_{max}}$ to z, x and y and $k_{tl_{min}}$, $k_{tl_{max}}$, $i_{tl_{min}}$ and $i_{tl_{max}}$ respectively in the definition of the domain and each of equations (1) to (24). Making the changes for the first permutation in FIGS. 4 and 5 results in the plane of FIGS. 4 and 5 each being a cross section on x=constant with the plane of FIG. 5 having an offset of 0.5Δx relative to the plane of FIG. 4, and making the changes for the second permutation in FIGS. 4 and 5 results in the plane of FIGS. 4 and 5 each being a cross section on y=constant with the plane of FIG. 5 having an offset of 0.5Δy relative to the plain of FIG. 4.

Propagation of a wave through a two-dimensional domain may also be simulated using the methods described above. A two-dimensional domain can be simulated in six different ways based upon equations (1) to (24). For example, each of FIGS. 4 and 5 show different examples of one of the six two-dimensional domains. Examples of the other four two-dimensional domains may be generated by taking the first and second permutations of FIG. 4, and the first and second permutations of FIG. 5, where first and second permutations are determined by changing x, y and z and tl$_{min}$ and tl$_{max}$ as described above.

Each of the six two-dimensional domains uses a modified subset of equations (1) to (24). The subset of equations (1) to (24) required for each of the two-dimensional domains is determined based upon those $E_w$ and $H_w$ points present in the two-dimensional domain. For example, the two-dimensional domain of FIG. 4 contains only $H_z$, $E_x$ and $E_y$ points and therefore uses equations (3), (4) and (5) for points not lying adjacent to a boundary, together with equations (13), (16) and (19) for points lying adjacent to a boundary. That is, equations (1), (2) and (6) used to determine values at $H_x$, $H_y$ and $E_z$ points respectively are not required and similarly equations (7), (10) and (22) are not required.

The selected equations are modified so as to remove those terms which are not present in the two-dimensional domain where necessary. For example, for the two-dimensional domain of which FIG. 4 is an example, equations (3) and (13) remain unchanged from the three-dimensional case, since equations (3) and (13) contain only $H_z$, $E_x$ and $E_y$ terms which all appear in the two-dimensional domain. Equations (4) and (16) are modified so as to remove $H_y$ terms and become equations (25) and (26) respectively below.

$$E_x^{n+1}(i, j, k) = \tag{25}$$

$$E_x^n(i, j, k) + \frac{\Delta t}{\epsilon(i, j, k)} \left[ \frac{H_z^{n+1}(i, j, k) - H_z^{n+1}(i, j-1, k)}{\frac{\Delta y_{(j-1)} + \Delta y_{(j)}}{2}} \right]$$

$$[i_{min} \leq i \leq i_{max} - 1, j_{min} + 1 \leq j \leq j_{max} - 1, k = \text{constant}]$$

$$E_x^{n+1}(i, j, k) = \tag{26}$$

$$E_x^n(i, j, k) + \frac{\Delta t}{\epsilon(i, j, k)} \left[ \frac{H_z^{n+1}(i, j, k) + \tilde{H}_z^{\tilde{n}+1}(i, j, k) - \left(H_z^{n+1}(i, j-1, k) + \tilde{H}_z^{\tilde{n}+1}(i, j-1, k)\right)}{\frac{\Delta y_{(j-1)} + \Delta y_{(j)}}{2}} \right]$$

$$[i_{min} \leq i \leq i_{max} - 1, j = j_{tl_{min}}, j = j_{tl_{max}}, k = \text{constant}]$$

where $\tilde{H}_z^{\tilde{n}+1}$ is determined according to equation (17) as before.

Similarly, Equations (5) and (19) are modified so as to remove $H_x$ terms and become equations (27) and (28) respectively below.

$$E_y^{n+1}(i, j, k) = \tag{27}$$

$$E_y^n(i, j, k) + \frac{\Delta t}{\epsilon(i, j, k)} \left[ \frac{H_z^{n+1}(i, j, k) - H_z^{n+1}(i-1, j, k)}{\frac{\Delta x_{(i-1)} + \Delta x_{(i)}}{2}} \right]$$

$$[i_{min} + 1 \leq i \leq i_{max} - 1, j_{min} \leq j \leq j_{max} - 1, k = \text{constant}]$$

$$E_y^{n+1}(i, j, k) = \tag{28}$$

$$E_y^n(i, j, k) + \frac{\Delta t}{\epsilon(i, j, k)} \left[ \frac{H_z^{n+1}(i, j, k) + \tilde{H}_z^{\tilde{n}+1}(i, j, k) - \left(H_z^{n+1}(i-1, j, k) + \tilde{H}_z^{\tilde{n}+1}(i-1, j, k)\right)}{\frac{\Delta x_{(i-1)} + \Delta x_{(i)}}{2}} \right]$$

$$[i = i_{tl_{min}}, i = i_{tl_{max}}, j_{min} \leq j \leq j_{max} - 1, k = \text{constant}]$$

where $\tilde{H}_z^{\tilde{n}+1}$ is determined according to equation (21) as before.

Other two-dimensional domains may be determined in a corresponding manner to that set out above for the two-dimensional domain of which FIG. 4 is an example.

Figure 6:
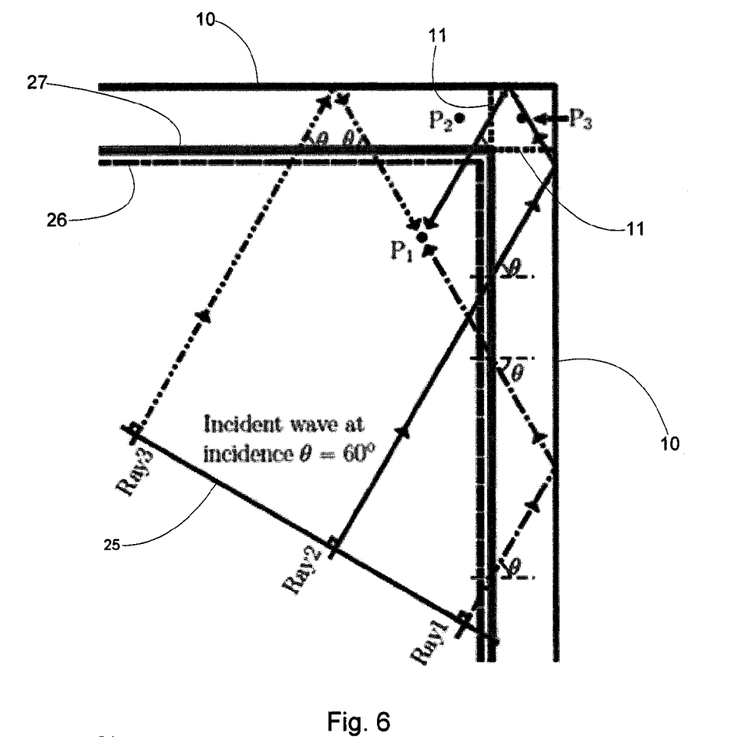
FIG. 6 is a schematic illustration of a plane wave striking a corner of a two-dimensional FDTD domain.

It has been indicated above that a domain that has extensions in corner regions (as indicated by 11 in FIGS. 1, 4 and 5) provides a better simulation of propagation of a wave through a space compared to the prior art domain using an HABC that does not have extensions in corner regions. FIG. 6 shows part of a two-dimensional FDTD domain where $E_x$, $E_y$, and $H_z$ are calculated. In FIG. 6 a plane wave, corresponding to line 25, is generated by a Huygens surface 26 which is placed closely to the absorbing boundary 27 to be tested so that reflected fields only are present in the interior domain, for example at a point $P_1$. The Huygens surface and the ABC are truncated by non-physical conditions so that the calculation is only valid for a time during 3300 to 3650 time steps from the beginning of the calculation with a 4000×2000 FDTD space, and incident angle for the plane wave of θ=60° with respect to the ABC. The incident wave 25 is a Gaussian pulse in the form of equation (29) below, where $t_0=15\Delta t$.

$$\exp\left[-\left(\frac{t-3t_0}{t_0}\right)^2\right] \quad (29)$$

Figure 7:
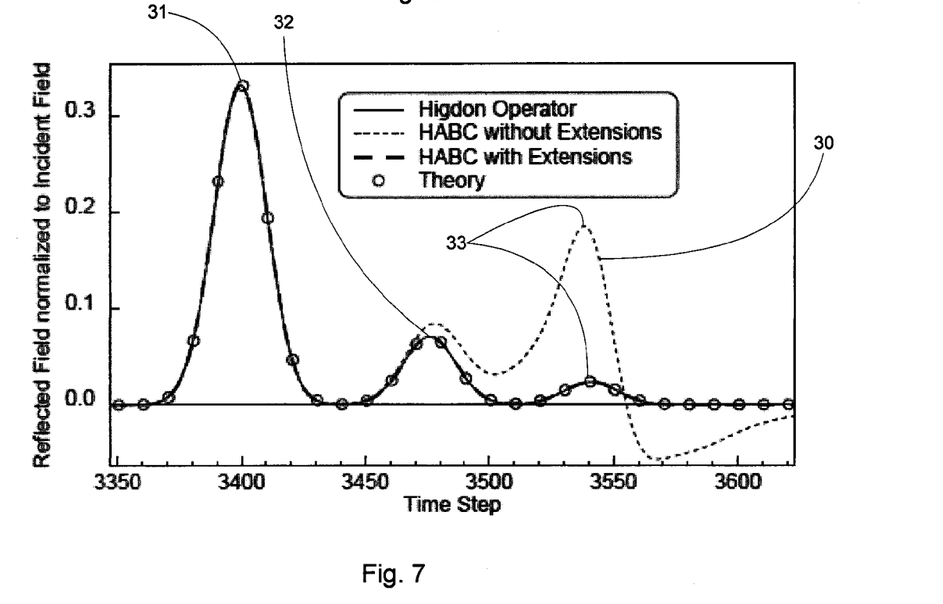
FIG. 7 is a graph showing a comparison of reflected fields computed at a point in the domain of FIG. 6 using different boundary definitions.

FIG. 7 shows a comparison of reflected fields at point $P_1$ in the domain of FIG. 6 for an HABC in which HABC extensions 11 are present and an HABC in which HABC extensions 11 are not present. Each of the domains using an HABC use a PEC 10, 20 FDTD cells from the HABC. Reflected fields at point $P_1$ in the domain of FIG. 6 in which the PEC 10 is replaced by a Higdon operator and without an ABC 27 are also shown. Points indicated by circles in FIG. 7 indicate theoretical values at a plurality of time steps, corresponding to ideal values at point $P_1$ in the simulation of the FDTD domain of FIG. 6. FIG. 7 shows that for time steps 3300 to 3650 (for which the calculation is valid, as indicated above) values at point $P_1$ agree very well between theoretical values and values for both the Higdon operator ABC and the HABC with extensions. A line 30 indicating values at point $P_1$ when the HABC without extensions is used indicates that values at $P_1$ vary considerably from theoretical values for values determined using the HABC without boundary extensions.

In FIG. 7, each of the waveforms consists of three pulses 31, 32, 33. The three pulses 31, 32, 33 correspond to three rays, Ray1, Ray3 and Ray2 represented in FIG. 6. Ray1 is the reflection from the vertical PEC boundary with incidence angle θ, Ray3 is the reflection from the horizontal boundary with incidence angle π/2−θ and Ray2 is the reflection from the corner. For the Higdon operator ABC and θ=60°, the corresponding reflection coefficients R(θ), R(π/2−θ) and R(θ)R(π/2−θ) for Ray1, Ray3 and Ray2 respectively are 0.3333, 0.0718 and 0.0239 respectively. These reflection coefficients, together with the differences between the ray paths, were used to compute the theoretical values for $P_1$ plotted in FIG. 7. As shown, values for $P_1$ for both the Higdon operator ABC and the HABC with extensions correspond closely to theoretical values for $P_1$. Values for $P_1$ for the HABC without extensions differ from theoretical values most significantly at peak 33 indicating that reflection from Ray2 is incorrect in this case. The reflection coefficient for Ray2 using the HABC without extensions is one order of magnitude larger than the theoretical reflection coefficient. Additionally it can be noted that since the pulse is no longer Gaussian, the reflection from Ray2 is dispersive.

Figure 8:
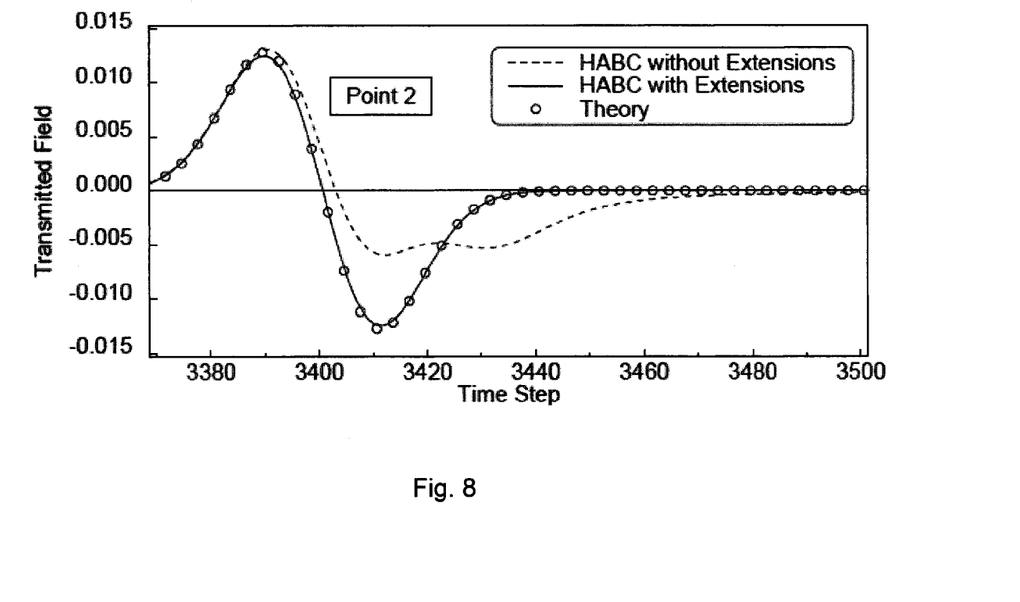
FIGS. 8 and 9 are further graphs showing a comparison of reflected fields computed at points in the domain of FIG. 6 using different boundary definitions.
Figure 9:
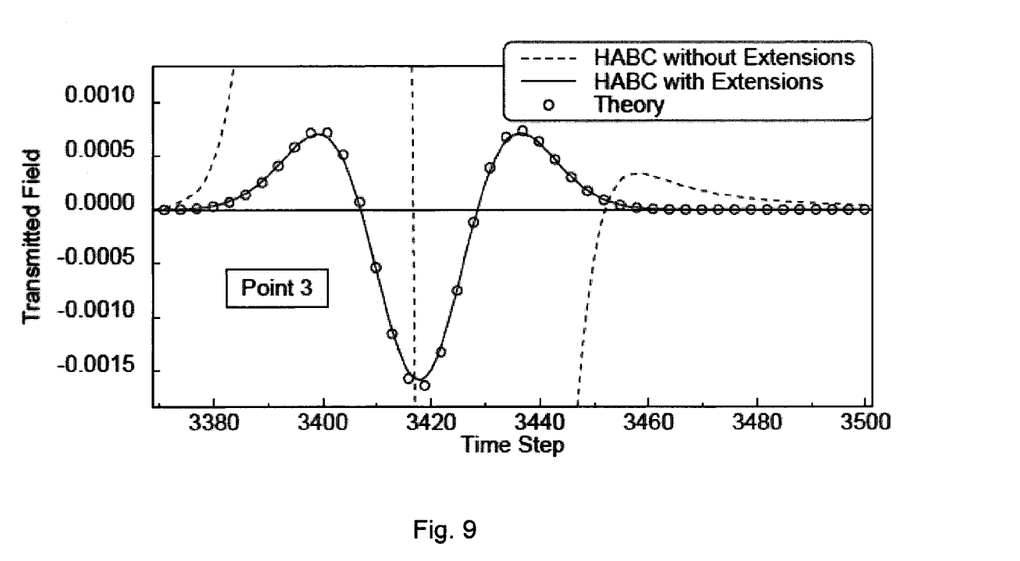

It has been described above that an FDTD has an HABC boundary and an additional PEC boundary. In an alternative embodiment the PEC boundary may be omitted and the FDTD space may be set so as to be large enough that no reflection from boundaries is observed within a sufficient number of time steps. For example, the domain of FIG. 6 may be provided with the PEC omitted and a large number (dependent upon the number of time steps required) of FDTD cells may be provided outside of the HABC 11. The HABC extensions are still provided and extend outwards in the usual way. FIG. 8 shows plots of values for a point $P_2$ and FIG. 9 shows plots of values for a point $P_3$ shown in FIG. 6, with values for each point plotted for each of theoretical values and values determined where boundary 27 is an HABC with and without extensions. It can be seen from FIGS. 8 and 9 that where the PEC boundary is omitted and HABC extensions are not used, values do not correspond with theoretical values, whereas where the PEC boundary is omitted and HABC extensions are used, values closely correspond to theoretical values.

The methods described above for simulating propagation of a wave through a space have wide application. In particular, current FDTD modelling applications include ultra-low frequency based applications such as geophysics modelling including land mine detection and mineral exploration and microwave based applications such as radar signature technology, antenna technology, wireless communications devices technologies, digital interconnects and biomedical imaging and treatment. Additionally FDTD modelling is used in visible light and optical applications to model scattering, diffraction and propagation of optical radiation. FDTD modelling is also used in health and safety fields where assessment of Specific Absorption Rate (SAR) is required, for example in modelling cellphone radiation interaction with the human head.

FDTD modelling is additionally useful in engineering problems in biophotonics, display technology, optical communications, optical sensing, imaging and collection, optical storage and semiconductor manufacturing, amongst others. Examples of areas of biophotonics for which FDTD modelling is useful include surface Plasmon devices, nanoparticle scattering and integrated biophotonic sensors. Examples of display technology areas for which FDTD modelling is useful include LED light extraction optimisation, nanowire grid polarizers and digital micromirror devices. Optical technologies for which FDTD modelling is useful include ring resonators, optical waveguides, optical filters, photonic crystal microcavities, photonic crystal vertical cavity surface emitting lasers (VCSEL), CMOS image sensor pixels, thin film silicon solar cell photovoltaics and DVD surface design. Examples of semiconductor manufacturing technology for which FDTD modelling is useful include DUV lithography simulation, surface Plasmon resonance interference nanolithography and metrology.

For example, where it is desirable to determine composition of a space (for example a volume of the surface of the earth in geophysics exploration), a finite difference time domain representing the space may be created as described above, in which permittivity and conductivity values for each point in the domain are set based upon an assumption of the material composition of the space represented by the respective point in the domain. A wave may be projected at the space and the resulting propagation of the wave may be measured. Propagation of a corresponding wave may be simulated in the domain and the measured propagation and simulated propagation may be compared. If the measured and simulated propagation differ significantly then it can be determined that the assumed permittivity and conductivity values are incorrect, indicating that the composition of the space is different to the assumed composition. The permittivity and conductivity values may be adjusted and simulation of propagation of the wave repeated until an acceptable degree of correspondence between the measured wave propagation and simulated propagation is achieved. Composition of the space may be determined based upon the permittivity and conductivity values which provide acceptable correspondence.

Similarly, where composition of a space is known or expected (for example in a semiconductor), the above simulation can be used to identify differences between expected wave propagation and actual wave propagation by comparing measured propagation of a wave through a space with ideal propagation of a wave through the space determined by simulating propagation of a wave through a space in which points have permittivity and conductivity values which are known to correspond to permittivity and conductivity of the space. In this way, faults can be identified in a material.

Although specific embodiments of the invention have been described above, it will be appreciated that various modifications can be made to the described embodiments without departing from the spirit and scope of the present invention. That is, the described embodiments are to be considered in all respects exemplary and non-limiting. In particular, where a particular form has been described for particular processing, it will be appreciated that such processing may be carried out in any suitable form arranged to provide suitable output data.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

What is claimed is:

1. A computer implemented method of modeling propagation of a wave through a first space using a computer comprising a memory and a processor that reads and executes instructions stored in said memory, wherein said instructions:
    store data in said memory representing said first space;
    store data in said memory representing a second space, said first space being within said second space, wherein said second space comprises a plurality of calculation blocks, each calculation block generating a value representing propagation of a wave at a point in said second space, each calculation block carrying out a calculation that determines a value for said point in said second space represented by said calculation block based upon a value generated by at least one other calculation block; and
    store data in said memory defining at least one boundary defining the first space within the second space the at least one boundary further dividing said second space into at least two spaces outside of the first space;
    wherein said each calculation block performs a calculation at least partly based upon whether said calculation block is adjacent to said boundary;
    wherein the method comprises using a processor that generates data based upon values generated by said calculation blocks, said data representing propagation of said wave through said first space;
    wherein said first and second spaces are generally rectangular two-dimensional spaces and said at least one boundary extends to an outer boundary of said second space;
    wherein said at least one boundary further divides said second space into eight spaces outside of the first space;
    wherein a first four of said eight spaces each define a side space having a side defined by a side of said inside space and a side defined by part of a boundary of said outside space;
    and wherein a second four of said eight spaces define corner spaces, each corner space having two sides defined by ends of two of said side spaces and two sides defined by a part of a boundary of said outside space.

2. A method according to claim 1, wherein said data represents said first space as a space selected from the group consisting of: a finite difference time domain (FDTD), a finite element method (FEM) domain, a method of moment domain, a finite volume method domain and a finite difference frequency domain.

3. A method according to claim 1, wherein each of said plurality of calculation blocks represents one of a first and second wave component, and calculation blocks representing adjacent points in said second space represent different ones of said first and second wave components;
    wherein each calculation block carries out a calculation that determines a value for said point in said second space represented by said calculation block based upon a value generated by calculation blocks representing points adjacent to said point in said second space.

4. A method according to claim 3, wherein said first wave component is an electric wave component and said second wave component is a magnetic wave component.

5. A method according to claim 3, wherein said second space is bounded by points having a value 0, and calculation blocks representing points adjacent to said points having a value 0 carry out a calculation based upon the value 0.

6. A method according to claim 1, wherein each calculation block adjacent to said boundary performs a calculation according to a Huygens absorbing boundary condition.

7. A method according to claim 1, wherein each calculation block not adjacent to said boundary performs a calculation according to a method selected from the group consisting of: a FDTD method, a finite element method, a method of moment, a finite volume method and a finite difference frequency domain method.

8. A method according to claim 7, wherein said first space is positioned centrally within said second space.

9. A method according to claim 7, wherein said second space extends around said first space.

10. A method according to claim 1, wherein said at least one boundary extends to an outer boundary of said second space.

11. A method according to claim 1, wherein said wave is an electromagnetic wave.

12. A method according to claim 1 wherein the first space comprises at least one medium and said data representing said first space represents characteristics of said at least one medium such that the method models propagation of a wave through the at least one medium.

13. A method according to claim 12, wherein said at least one medium is selected from the group consisting of: air, rock, an optical element, a part of a body of a person and an antenna.

14. A method for determining the composition of a space, the method comprising:

generating data indicating an estimated composition of the space;

modelling propagation of a wave through said space based upon said generated data using a method according to claim 1;

propagating said wave through said space to generate measured propagation data;

comparing data determined from said modelling with said measured propagation data to determine an accuracy of said data indicating an estimated composition of the space; and if said comparison indicates that said data indicating an estimated composition of the space is insufficiently accurate:

(i) modifying said data indicating an estimated composition of the space;

(ii) modelling propagation of a wave through said space based upon said modified data using a method according to claim 1;

(iii) comparing data determined from said modelling of step (ii) with said measured propagation data to determine an accuracy of said modified data indicating an estimated composition of the space; and (iv) if said comparison of step (iii) indicates that said data indicating an estimated composition of the space is insufficiently accurate, repeating steps (i) to (iii) until said comparison of step (iii) indicates that said modified data indicating an estimated composition of the space is sufficiently accurate.

15. A method for verifying the composition of a space, the method comprising:

generating data indicating an expected composition of the space;

modelling propagation of a wave through said space based upon said generated data using a method according to claim 1;

propagating said wave through said space to generate measured propagation data;

determining whether said space has the expected composition depending upon a relationship between the measured propagation data and data determined from said modelling.

16. A computer program stored on a non-transitory computer readable medium comprising computer readable instructions that instruct a computer to carry out a method according to claim 1.

17. A computer apparatus for modelling propagation of a wave through a first space comprising:

a memory storing processor readable instructions; and a processor that reads and execute instructions stored in said memory;

wherein said processor readable instructions comprise instructions that control the computer to carry out a method according to claim 1.

18. A computer implemented method of modelling propagation of a wave through a first space using a computer comprising a memory and a processor that reads and executes instructions stored in said memory, wherein said instructions:

store data in said memory representing said first space;

store data in said memory representing a second space, said first space being within said second space, wherein said second space comprises a plurality of calculation blocks, each calculation block generating a value representing propagation of a wave at a point in said second space, each calculation block carrying out a calculation that determines a value for said point in said second space represented by said calculation block based upon a value generated by at least one other calculation block; and store data in said memory defining at least one boundary defining the first space within the second space the at least one boundary further dividing said second space into at least two spaces outside of the first space;

wherein said each calculation block performs a calculation at least partly based upon whether said calculation block is adjacent to said boundary;

wherein the method comprises using a processor that generates data based upon values generated by said calculation blocks, said data representing propagation of said wave through said first space;

wherein said first and second spaces are generally cuboid three-dimensional spaces, and said at least one boundary extends to an outer boundary of said second space;

wherein said at least one boundary further divides said second space into twenty six three-dimensional spaces outside of the first space;

wherein six of said twenty six spaces each define cuboids having a first side corresponding to one side of said first space, a second side forming part of said outer boundary of said second space and being parallel to said first side, and four further sides joining said first and second sides;

wherein eight of said twenty six spaces each define corner cuboids, each corner cuboid abutting a respective corner of said first space; and wherein twelve of said twenty six spaces each define side cuboids, each side cuboid abutting a respective intersection of two sides of said first space.

19. A method for determining the composition of a space, the method comprising:

generating data indicating an estimated composition of the space;

modelling propagation of a wave through said space based upon said generated data using a method according to claim 18;

propagating said wave through said space to generate measured propagation data;

comparing data determined from said modelling with said measured propagation data to determine an accuracy of said data indicating an estimated composition of the space; and if said comparison indicates that said data indicating an estimated composition of the space is insufficiently accurate:

(i) modifying said data indicating an estimated composition of the space;

(ii) modelling propagation of a wave through said space based upon said modified data using a method according to claim 18;

(iii) comparing data determined from said modelling of step (ii) with said measured propagation data to determine an accuracy of said modified data indicating an estimated composition of the space; and (iv) if said comparison of step (iii) indicates that said data indicating an estimated composition of the space is insufficiently accurate, repeating steps (i) to (iii) until said comparison of step (iii) indicates that said modified data indicating an estimated composition of the space is sufficiently accurate.

20. A method for verifying the composition of a space, the method comprising:

generating data indicating an expected composition of the space;

modelling propagation of a wave through said space based upon said generated data using a method according to claim 18;

propagating said wave through said space to generate measured propagation data;

determining whether said space has the expected composition depending upon a relationship between the measured propagation data and data determined from said modelling.

21. A computer program stored on a non-transitory computer-readable medium comprising computer readable instructions that instruct a computer to carry out a method according to claim 18.

* * * * *